April 22, 1958    A. P. RASMUSSEN ET AL    2,831,643
AIRCRAFT CONTROL SYSTEM FOR LIMITING AIRFRAME STRESS
Filed Jan. 18, 1955
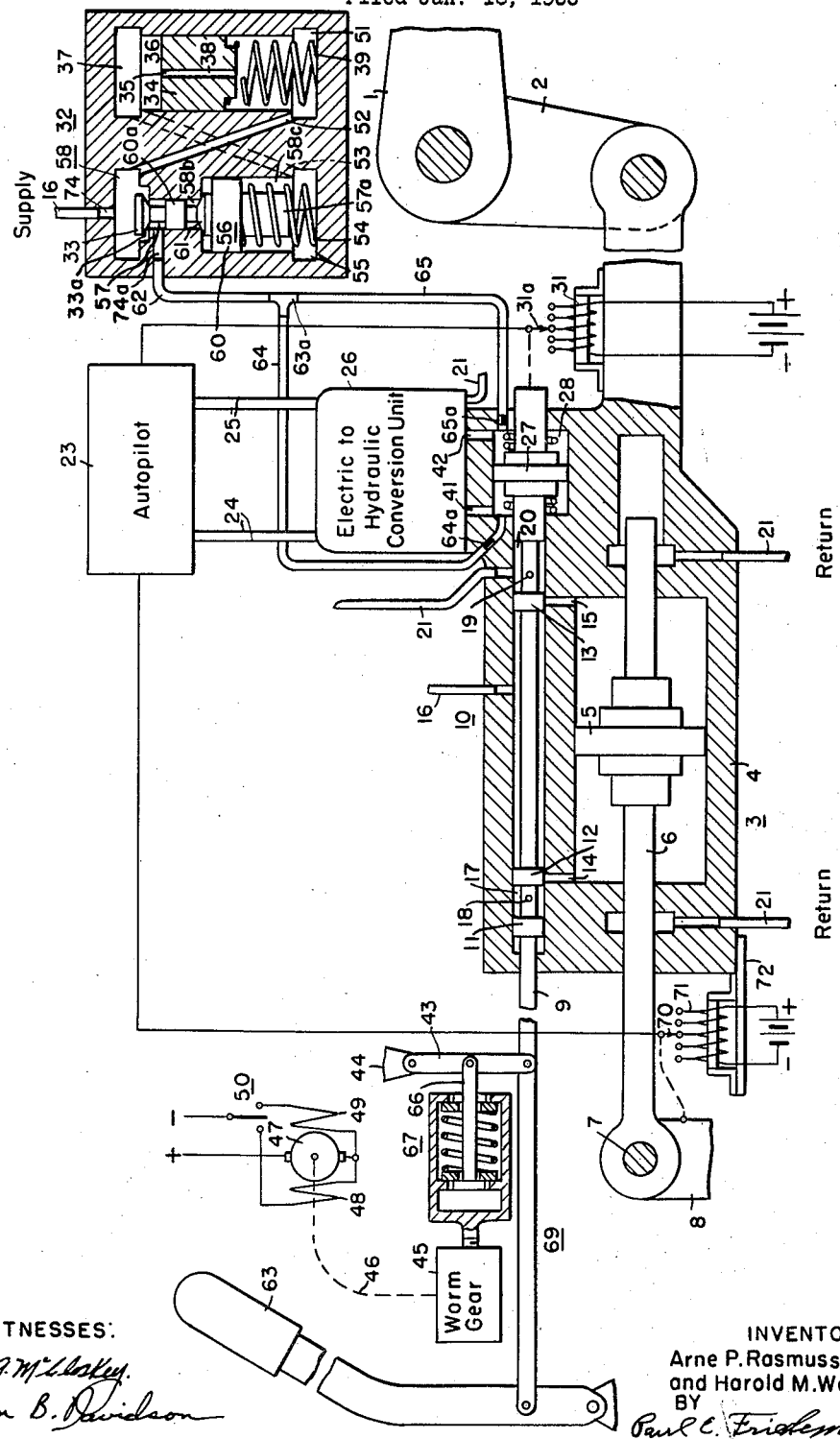
WITNESSES:
E. G. McCloskey.
John B. Davidson
INVENTORS
Arne P. Rasmussen
and Harold M. Watson.
BY
Paul C. Friedemann
ATTORNEY United States Patent Office 2,831,643
Patented Apr. 22, 1958

2,831,643

AIRCRAFT CONTROL SYSTEM FOR LIMITING AIRFRAME STRESS

Arne P. Rasmussen, Millersville, and Harold M. Watson, Catonsville, Md., assignors to Westinghouse Electric Corporation, East Pittsburgh, Pa., a corporation of Pennsylvania Application January 18, 1955, Serial No. 482,451

6 Claims. (Cl. 244—78)

Our invention relates generally to aircraft control systems and more particularly to control systems for limiting the centrifugal force exerted on the structural members of the aircraft during flight maneuvers thereof.

In recent years, hydraulic control systems for aircraft have been developed which provide an extremely high mechanical advantage to both a pilot and an auto-pilot under in-flight operating conditions. Due to varying flight conditions, the effect of a given deflection of the control surfaces of an aircraft may vary over wide ranges. For example, it is known that a given deflection of the aircraft control surface will produce a far greater effect at low altitudes than at high altitudes and that the centrifugal forces exerted by the consequent greater rate of change of attitude will be proportionally larger at the lower altitudes. Protective devices limiting the maximum extent to which the control surfaces may be deflected are not satisfactory, as insufficient control may be exerted at high altitudes to properly maneuver the aircraft, particularly with respect to fighter aircraft wherein maximum maneuverability is of paramount importance. The high mechanical advantage imparted to the pilot or autopilot by hydraulic control systems makes it particularly easy for the maximum safe centrifugal force to be exceeded.

Inasmuch as an autopilot is unable to sense the fact that flight conditions have changed, a strong deflection signal injected into the autopilot could easily result in severe damage to the structural members of the aircraft. For example, a radar gun sight could command such large control surface deflections at low altitudes that the aircraft conceivably could be literally torn apart. Furthermore, inasmuch as the autopilot is an electronically controlled device, it is peculiarly susceptible to malfunction of the component parts thereof. A short circuit in the electronic circuitry of the autopilot conceivably could provide a deflection signal of such magnitude as to produce centrifugal forces far in excess of that for which the aircraft is designed.

Furthermore, it is highly desirable to provide automatic means in an aircraft control system for limiting the control of the autopilot over the aircraft when a maximum rate of change of centrifugal force exerted thereon is exceeded so that control may be removed from the autopilot when it is inevitable that the maximum centrifugal force for which the aircraft is designed will be exceeded.

Accordingly, it is one object of this invention to provide an aircraft control system that will limit changes in attitude of the aircraft in accordance with a predetermined maximum centrifugal force to be exerted thereon during flight maneuvers of the aircraft.

Another object is to provide an aircraft control system that will limit the rate of change of centrifugal force that may be exerted on an aircraft during flight maneuvers thereof, as well as limiting the centrifugal force to a given maximum.

A still further object is to provide an aircraft control system which will limit changes in attitude of the aircraft in accordance with a given maximum centrifugal force and a given maximum rate of change of centrifugal force to be exerted on the aircraft without unduly impairing control of the craft under any given flight conditions.

The foregoing statements are merely illustrative of the various aims and objects of this invention. Other objects and advantages will become apparent upon a study of the following disclosure when taken in conjunction with the accompanying drawing, wherein the single figure schematically illustrates an aircraft control arrangement embodying the principles of this invention.

With reference now to the single figure of the drawings, there is shown in considerable detail an aircraft control system making use of the principles of our invention. An aircraft control surface 1 is shown connected to a control arm 2 which is driven by a hydraulic actuator generally designated by the reference numeral 3. This hydraulic actuator 3 comprises a cylinder 4 and a piston member 5. The piston 5 is mounted on a rod 6 which strokes within bearing surfaces in the end of cylinder 4, and which extends through the left end of the cylinder. The rod 6 is pivotally anchored at 7 to a stationary pivot support 8 which is conveniently secured to some portion of the aircraft.

The actuator is controlled by a boost valve generally designated by the reference numeral 10 which is mounted on the top side of the cylinder and is provided with a slide valve element 11. A pair of valve members 12 and 13 are secured to slide valve element 11 to control the flow of hydraulic fluid through respective ports 14 and 15 in the ends of cylinder 4. Hydraulic fluid under pressure is admitted to the boost valve through a supply conductor 16 which enters the boost valve housing at a point intermediate the respective valves 12 and 13.

Displacement of the slide valve element 12 to the right closes or seals the valve port 14 from the supply of hydraulic fluid and opens the valve port 15 to the supply. High pressure hydraulic fluid is thereby admitted to the right side of piston 5 of the actuator. Since the piston 5 is secured against movement, there results a displacement of cylinder 4 to the right which deflects elevator 1 upwardly. The diminishing volume on the left side of piston 5 forces hydraulic fluid through a port 14 now functioning as an exhaust port into a cavity 17 on the left side of valve 12. The fluid is exhausted from cavity 17 by entering a hole 18 in the shaft of slide valve element 11 which extends longitudinally through this element to a hole 19 to the right of valve 13. At this point, the fluid exhausts into cavity 20 which is connected to the return line 21 of the hydraulic system.

In order to simplify the illustration, the complete hydraulic system has not been shown; however, for the purpose of identification each supply conductor leading from a source of fluid pressure to the control system and each return conductor are respectively numbered 16 and 21. It will be understood from this that the respective conductor may be fed from a common supply source (not shown), such as a fluid pressure pump which may or may not be connected with an accumulator to produce a supply of hydraulic pressure. Similarly, each of the return lines 21 may be connected to a suitable sump or other hydraulic reservoir for the system from which the hydraulic fluid may be drawn by the pump.

Side valve element 11 is controlled by two different control sources. One of these is represented by the autopilot 23 shown only in block outline, since its details are not important to the present invention, and the other is represented by a control stick 63 which is actuated by the human pilot. The autopilot may be any of a number of suitable types, a preferred type being illustrated in U. S. Patent No. 2,683,288 to C. R. Hanna, and assigned to the assignee of this invention. Such an autopilot should be capable of producing a pair of differentially related electrical signals which indicate a departure in the desired flight attitude when operating in the cruise mode. This output is represented in the drawings by respective pairs of electrical conductors 24 and 25 which are utilized to control an electric-to-hydraulic conversion unit 26 which controls the hydraulic pressure on opposite sides of piston 27. An exemplary electric-to-hydraulic conversion unit is described in the copending application of Arne P. Rasmussen, Serial No. 375,546 for "Control System," filed August 20, 1953, now U. S. Patent No. 2,773,660, and assigned to the assignee of the present invention. The piston 27 reciprocates within a cylinder 28 and is directly connected to slide valve element 11 to cause displacement thereof in accordance with the control effected by the autopilot through the pilot valve assembly.

As described in the aforementioned Rasmussen application Serial No. 375,546, boost valve position feedback is obtained by means of a potentiometer 31 having a tap 31a. The potentiometer is physically mounted on the boost cylinder housing and moves therewith. Tap 31a is actuated by the slide valve. Potentiometer 31 is energized by a suitable source of electrical energy and tap 31a is electrically connected in a feedback loop with the autopilot.

Control circuit position feedback is obtained by means of a potentiometer 71 having a tap 70, which potentiometer is energized by a suitable source of electrical energy, preferably a direct current source. The potentiometer is physically mounted on the boost cylinder housing and moves therewith, the tap 70 is affixed to the aircraft frame. Tap 70 is electrically connected in a feedback loop with the autopilot so as to progressively diminish the output signal from the autopilot as the piston 5 is brought to a position within its cylinder housing 4 corresponding to the flight attitude determined by the autopilot.

The output of the electric-to-hydraulic conversion unit controls fluid exit from ports 41 and 42 which open into cylinder 28 within which piston 27 reciprocates. The aforementioned return conduit 21 is also connected to the conversion unit 26 to provide a return path to the sump (not shown) for fluid entering the conversion unit from ports 41 and 42. Supply conduit 16 is connected to cylinder 28 through a valve to be described hereafter, through conduit 62, T-connection 62a and conduit 65 which are serially connected in the order specified. Conduit 65 opens through an orifice restriction 65a into chamber 28 to the right of piston 27 as shown. Fluid enters cylinder 28 to the left of piston 27 from T-connection 62a through conduit 64 through an orifice restriction 64a.

As described in the aforementioned Rasmussen application Serial No. 375,546, a signal from autopilot output channels 24 and 25 will determine which of the ports 41 and 42 fluid entering chamber 28 will pass through in exhausting to a return line 21. When the aircraft is in proper flight attitude, no fluid will pass through the conversion unit 26 to the return line. Both exhaust ports 41 and 42 will be blocked and the pressure on opposite sides of piston 27 will be equal; the piston 27 will occupy a neutral position in which the valves 12 and 13 seal their respective ports 14 and 15. On a departure from normal flight attitude, one or the other of the exhaust ports 41, 42 is blocked and the hydraulic pressures on opposite sides of the piston 27 are unbalanced. Consequently, the actuator cylinder is displaced in one direction or the reverse, displacing the elevator to cause a pitch rate in such a sense as to restore the aircraft to the proper flight attitude or to a proper position in elevation depending on the nature of the autopilot control.

Manual control for the actuator cylinder is exercised from control stick 63 through a mechanical linkage 69 to slide valve element 9. Variations in the center of gravity location of the aircraft such as may be occasioned by the progressively diminishing fuel supply will tentatively cause the aircraft to rotate about one of its control axes unless the control surfaces are trimmed so as to maintain a normal flight attitude. This latter function is provided by means of a screw jack including D. C. motor 47 driving a mechanical linkage 43 through a gear 45 and a bungee spring 67. The control switch 50 may be provided at any convenient control position so as to energize one of motor fields 48, 49 in accordance with the direction of rotation desired. The screw jack-bungee spring combination makes it possible to adjust the neutral position of the aircraft control surfaces without impairing the control exerted by the pilot by means of control stick 63.

As mentioned heretofore, a valve mechanism 32 is inserted between supply conduit 16 and the conduit 62 leading to the fluid conduits 64 and 65 to boost valve 10 and chamber 28. The function of this valve is to cut off fluid flow when either the centrifugal force exerted thereon or the rate of change of centrifugal force exceeds predetermined values. The section of the valve that is responsive to centrifugal force includes a piston member 56 disposed within a chamber 58. A portion 57 of piston member 56 is machined to a small diameter to form a head section 33 with a tapered section 33a intermediate between sections 57 and 33. The portion 61 of piston member 56 at the other end of reduced section 57 is similarly tapered.

Annular collars 60a and 60 are respectively secured to machined section 57 and the non-machined section 57a of piston member 56. Chamber 58, which comprises at least three cylindrical sections of various cross-sectional areas, has a central section 58b corresponding generally in length to piston section 57, which has a reduced diameter so as to be in sliding fit with collar 60a. The shoulders thus formed cooperate with tapered sections 61 and 33a to form fluid-tight seals. The length of reduced section 57 is such that the piston has a small amount of play as the tapered faces 33a and 61 alternately abut against the shoulder corresponding thereto.

A fluid port 74 drilled into the top of the valve housing opens into chamber 58 so as to provide fluid entry thereinto from supply conduit 16. A second fluid port 74a is drilled into the side of the valve housing opening into the central section 58b to provide fluid communication between section 58b and conduit 62. Spring retaining collar 60 is in sliding fit with the walls of lower section 58c of chamber 58. Spring 54 bears against collar 60 to normally bias tapered section 61 so as to prevent fluid entry into the cavity section 58c.

Under a given centrifugal force determined by the spring constant of spring 54 and the mass of the movable valve member assembly, the force of the spring will be overcome and the valve member will move downwardly, as viewed, to effectively close off fluid communication between supply conduit 16 and conduit 62.

The various chamber sections mentioned heretofore are preferably cylindrical in cross-sectional area and have a common axis. If convenient, however, deviation may be made from the cylindrical configuration.

A second chamber, again preferably of cylindrical cross-sectional area, having an axis substantially parallel to that of the chamber described heretofore, is provided wherein a metal body 34 is in sliding fit therewith. A spring 39 biases the body 34 away from one end of the chamber 36; this spring has a given spring constant $K_1$ which constrains the body against movement in a downwardly direction as viewed.

A capillary hole 35 extends axially through the body 34 (for convenience of manufacture, the capillary hole is axially located, but if desired, it may be displaced away from the axis of the chamber).

A pair of fluid communication passages 53 and 52 respectively interconnect the lower section 58c of chamber 58 with the upper section of chamber 36 and the lower section of chamber 36 with the upper section of chamber 58.

Under the influence of centrifugal force imposed upon body 34, the body will tend to move downwardly as viewed. The equation of motion of this mass is as follows:

$$\Delta P A_p + K x_1 + M \frac{d^2 x_1}{dt^2} = \frac{M d^2 x_0}{dt^2} \quad (1)$$

where $\Delta P$=the differential pressure across the piston
$A_p$=piston area
$K_1$=spring constant
$x_1$=displacement of mass with respect to the system
$M$=mass of body
$x_0$=displacement of mass with respect to the earth The friction flow resistance from the Hagen Porseville formula is $$\Delta P = \frac{8\mu L}{\pi r^4} Q$$

$\mu$=viscosity

But $$Q \text{ (the flow)} = A_p \frac{dx_1}{dt}$$

Therefore $$\Delta P A_p = K_2 \frac{dx_1}{dt}$$

where $$K_2 = \frac{8\mu L}{\pi r^4} A_p^2 \quad (2)$$

Rewriting Equation 1

$$\frac{M d^2 x_1}{dt^2} + K_2 \frac{dx_1}{dt} + K x_1 = \frac{M d^2 x_0}{dt^2}$$

Let $$F(s)_0 = \text{Laplace transform of } \frac{d^2 x_0}{dt^2}$$

$$F(s)_1 = \text{Laplace transform of } \frac{dx_1}{dt}$$

$$s = \text{Laplace operator} = \frac{d}{dt}$$

The transformed equation may now be written $$\left(Ms + K_2 + \frac{K_1}{s}\right) F(s)_1 = M F(s)_0$$

$$F(s)_1 = \frac{s M F(s)_0}{M s^2 + K_2 s + K_1}$$

From (2)

$$\Delta P = \frac{K_2}{A_p} \frac{dx_1}{dt} = \frac{K_2}{A_p} F(s)_1$$

Therefore $$\Delta P = \frac{K_2 M s F(s)_0}{A_p (M s^2 + K_2 s + K_1)}$$

This equation states that the differential pressure is proportional to the $sF(s)_0$, the rate of change of acceleration, but is somewhat modified by the quadratic $$(Ms^2 + K_2 s + K_1)$$

By suitably selecting the parameters of the system, this quadratic can be made to have a negligible effect on the measurement of the acceleration rate in the ranges required.

By applying this differential pressure across the piston through the cross-connecting fluid communication channels 52 and 53 in the manner shown, the piston of the valve is forced downwardly and the valve effectively prevents fluid communication between conduits 16 and 62 whenever the rate of change of centrifugal force exceeds a value determined by the constants of spring 39 of body 34 and the associated capillary hole 35.

It is to be noted that the hole 35 is more than just a device for permitting fluid flow between the opposite ends of the body 34, but is effective to produce an actuating force for valve piston 57; its cross-sectional area is necessarily less than that which would provide free flow of fluid between the opposite ends of the body 34.

In accordance with the teachings of our invention, there has been provided a relatively simple mechanism for limiting the control of both a pilot and autopilot in the event of excessive centrifugal forces exerted upon an aircraft and also in the event of excessive rates of change of centrifugal force.

The invention is not to be restricted to the specific structural details, arrangement, or arrangement of parts herein set forth, and its various modifications thereof may be effected without departing from the spirit and scope of this invention, and it is desired that only such limitations shall be imposed as are indicated in the accompanying claims.

We claim as our invention:

1. Hydraulic control means for a control surface of an aircraft comprising: a first hydraulically operated actuator having a moving part connected to said control surface; valve means mounted on said moving part of said actuator and having a movable valve element for controlling hydraulic pressure in said fluid operated actuator; a second hydraulically operated actuator connected to said movable valve element; an autopilot coupled to said second actuator adapted to control movement thereof by controlling hydraulic pressure therein; second valve means coupled between a hydraulic pressure source and said second actuator adapted to cut off hydraulic pressure thereto responsive to a given rate of change of centrifugal force exerted thereon during maneuvers of said aircraft.

2. Hydraulic control means for a control surface of an aircraft comprising: a first hydraulically operated actuator having a moving part connected to said control surface; valve means mounted on said moving part of said actuator and having a movable valve element for controlling hydraulic pressure in said hydraulically operated actuator; a second hydraulically operated actuator connected to said movable valve element; an autopilot coupled to said second actuator adapted to control movement thereof; and second valve means coupled to said second actuator adapted to cut off hydraulic pressure thereto responsive to a given centrifugal force exerted thereon during maneuvers of said aircraft; and means coupled to said second valve means adapted to actuate said second valve means responsive to a given rate of change of centrifugal force.

3. Hydraulic control means for a control surface of an aircraft comprising: a first hydraulically operated actuator having a moving part connected to said control surface; valve means mounted on said moving part of said actuator and having a movable valve element for controlling hydraulic pressure in said hydraulically operated actuator; a second hydraulically operated actuator connected to said movable valve element; an autopilot coupled to said second actuator adapted to control movement thereof; and fluid control means coupled to said second actuator adapted to cut off hydraulic pressure thereto responsive to a given centrifugal force exerted thereon during maneuvers of said aircraft; means adapted to actuate said fluid control means responsive to a given rate of change of centrifugal force; said fluid control means including a housing, a cavity within said housing, orifices connecting said cavity to a source of pressurized fluid and to said second actuator, valve means within said cavity adapted when closed to cut off fluid communication between said orifices, and means normally biasing open said last-named valve means adapted to be overcome to close said valve by centrifugal force of predetermined magnitude exerted thereon during maneuvers of said aircraft, and means in fluid communication with said last-named valve means adapted to close said last-named valve means responsive to a given rate of change of centrifugal force.

4. Hydraulic control means for a control surface of an aircraft comprising: a first hydraulically operated actuator having a moving part connected to said control surface; valve means mounted on said moving part of said actuator and having a movable valve element for controlling fluid pressure in said hydraulically operated actuator; a second hydraulically operated actuator connected to said movable valve element; an autopilot coupled to said second actuator adapted to control movement thereof; and fluid control means coupled to said second actuator adapted to cut off hydraulic pressure thereto responsive to a given centrifugal force exerted thereon during maneuvers of said aircraft and responsive to a given rate of change of centrifugal force; said fluid control means including a housing, a cavity within said housing, orifices connecting said cavity to a source of pressurized fluid and to said second actuator, second valve means within said cavity adapted when closed to cut off fluid communication between said orifices, and means normally biasing open said second valve means adapted to be overcome to close said second valve means by centrifugal force of predetermined magnitude exerted thereon during maneuvers of said aircraft; a second cavity within said housing, a body within said cavity adapted to be in sliding fit therewith, a capillary hole of predetermined dimensions extending through said body, spring means biasing said body against centrifugal force exerted by said aircraft during maneuvers thereof, channels within said housing provided fluid communication between said cavities adapted to transmit the pressure differential produced by movement of said body in response to said centrifugal force so as to tend to close said second valve means.

5. A fluid control valve for fluid of given viscosity to be actuated by centrifugal force comprising: a valve body having first and second bores therein; fluid passages for conducting fluid into and out of said first bore, a valve member adapted to reciprocate within said first bore having an enlarged head, and adapted to shut off fluid flow into and out of said bore by differential pressure exerted across said valve member; said second bore having a spring-restrained member in sliding fit therein, said spring-restrained member having a capillary orifice extending therethrough opening to opposite ends of said second bore and fluid communication channels connecting the ends of said second bore to opposite ends of said first bore, said spring-restrained member being restrained against movement in oppositon to centrifugal force of a given sense; the dimensions of said capillary hole being such that differential perssure across said spring-restrained member is proportional to the rate of change of centrifugal force thereon.

6. A fluid control valve actuated by centrifugal force comprising: a first cavity including a plurality of sections of progressively increasing cross-sectional area extending in both directions from a central section along a given axis; a valve stem disposed on said axis supported within said central section by a collar disposed in sliding fit with said cavity, valve heads on each end of said stem adapted to shut off fluid communication between said end cavities and said central cavity, and stem being of a length such that only one valve head at a time may engage the end of said central cavity; a spring-restrained mass in sliding fit with a cavity adjacent said central cavity and affixed to the valve head corresponding thereto, said spring biasing said mass toward said central cavity, first and second fluid communication passages respectively opening into said central cavity and into the other of said cavities of progressively increasing cross-sectional area on the opposite side of said central cavity to that occupied by said spring-restrained mass; a second cavity disposed on a second axis substantially parallel to said given axis, a second spring-restrained mass in substantial sliding fit within said second cavity, said mass being biased in the same direction as said first spring-restrained mass, a capillary orifice extending through said second mass to opposite ends of said second cavity, and fluid communication passages interconnecting opposite ends of said first and second cavities.

References Cited in the file of this patent

UNITED STATES PATENTS

| | | |
|---|---|---|
| 1,921,710 | Stohr | Aug. 8, 1933 |
| 2,222,886 | Voigt | Nov. 26, 1940 |
| 2,395,671 | Kleinhans | Feb. 26, 1946 |
| 2,705,940 | Edwards | Apr. 12, 1955 |